Sept. 27, 1949.                H. C. BEHNKE                  2,483,173
                            ROTARY COOKY-MAKER
Filed Sept. 25, 1946                                    2 Sheets-Sheet 1
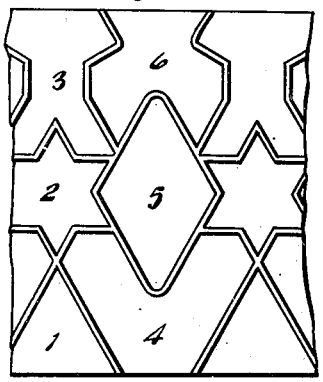
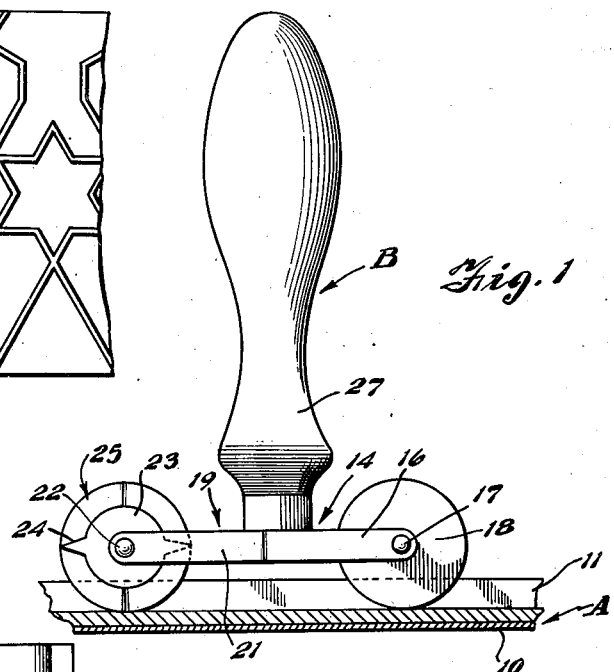
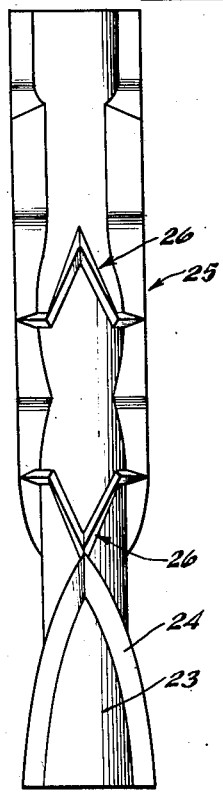
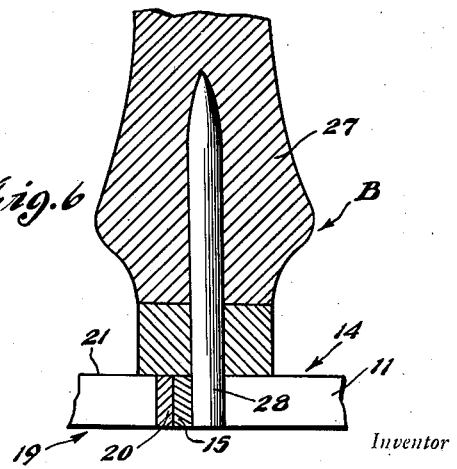
Inventor
*Herbert C. Behnke*
By *Clarence A. O'Brien
and Harvey B. Jacobson*
Attorneys Sept. 27, 1949.  H. C. BEHNKE  2,483,173
ROTARY COOKY-MAKER
Filed Sept. 25, 1946  2 Sheets-Sheet 2

Inventor
Herbert C. Behnke
By Clarence A. O'Brien
and Harvey B. Jacobson
Attorneys Patented Sept. 27, 1949

2,483,173

UNITED STATES PATENT OFFICE 2,483,173

ROTARY COOKY-MAKER

Herbert C. Behnke, West Hartford, Conn.

Application September 25, 1946, Serial No. 699,216

1 Claim. (Cl. 107—47)

The present invention relates to novel devices and ways and means of employing same in a practical and convenient manner to facilitate the making of cookies.

More specifically, I am interested in a simple and practical combination of structural parts which coordinate their proportionate functions in providing the user with novel and practical household means for rolling, cutting and baking cookies having designs and appearances of varied and unique forms.

In carrying out particularized phases of the inventive concept, I contemplate the adoption and use of an especially constructed open-ended, shallow tray or pan in which the dough is placed and between the longitudinal walls of which the manually operable rolling and cutting implement is tracked back and forth, said tray being some 15 inches in length and of appropriate width and having the added function whereby it serves as a baking plate, thus rendering unnecessary the work of transferring the cookie dough cut-outs from the tray to a special baking plate.

Another aspect of the invention has to do with a tray of the aforementioned type which is simple in construction and which has longitudinal edge portions bent into parallel side rims, one of said side rims having an outstanding horizontal flange which rests on the table or other support and which serves as ways and means to facilitate holding the pan and also handling it during the step of placing same in the oven and removing it after the baking step is concluded.

Another object of the invention has to do with a frame structure which is made up of complemental and companion U-shaped units, these being placed in back-to-back order and connected together in proper relationship, said units serving as individual yokes, one for a plain surfaced roller which functions as a rolling pin, and the other as a support and carrier for second idling roller, the latter having its surface provided with ribs of varied designs and configurations to provide differing patterns and to provide cutting elements as well, the ribbed roller being the rotary cookie dough cutter.

Numerous other features and advantages of the invention will become more readily apparent from the following description and the accompanying illustrative drawings.

In the drawings, wherein like numerals are employed to designate like parts throughout the views:

Figure 1 is a side view of the handle and roller-equipped unit showing fragmentary portions of the pan, dough, and the manner of using said implement.

Figure 4 is a plan view of the rotary cookie dough cutter roller.

Figure 6 is a fragmentary section showing the abutting yokes or frame sections and the means of attaching the hand-grip thereto.

Figure 7 is a diagrammatic view showing the manner in which the rotary cutter roller is preferably fashioned to provide the multiplicity of designs to be rolled and cut out of the dough.

Figure 2:
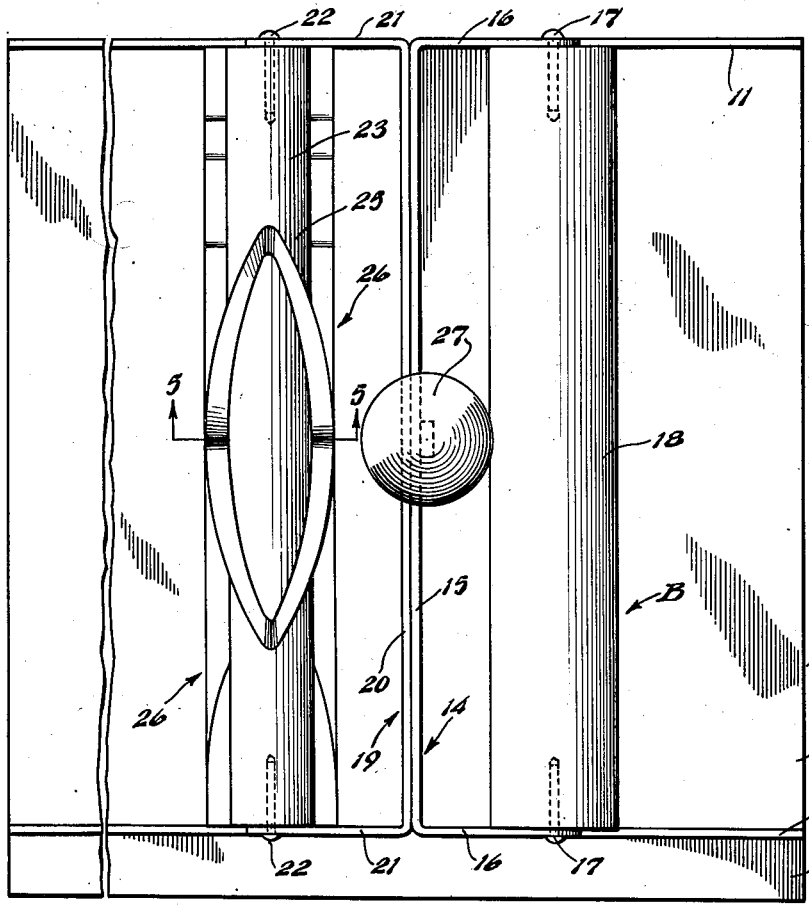
Figure 2 is a top plan view showing the full pan and also showing the manner in which the rollers of the implement fit between the rims of the pan to enable the pan and implement to coact in companionate relationship.

Referring now to the drawings by distinguishing reference numerals, it will be observed that the assemblage is characterized by two main parts; namely, the cookie dough pan or tray A and the relatively moveable and detachably associated twin roller implement B. These parts A and B are expressly designed and constructed for proper interfitting and mating use.

Figure 3:
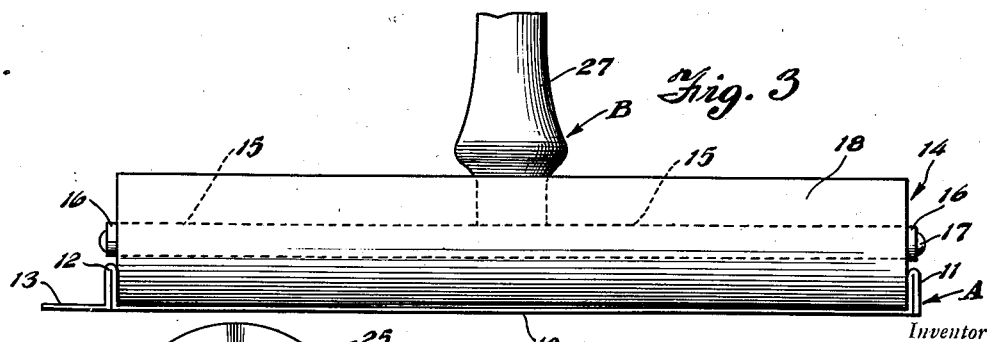
Figure 3 is an end elevation of the structure seen in Figure 2, observing same in a direction from right to left.

Referring now to the pan or tray, this comprises a sheet metal plate which is bent upon itself to provide a flat bottom 10 and longitudinal, upstanding, parallel walls or rims 11 and 12. As seen in Figure 3, the rim 11 is formed by simply bending the sheet metal down and upon itself to provide a double ply formation. The same double ply formation is used in constructing the wall or rim 12 on the other side (see Fig. 3) except that the extremity of the metal is here extended out to provide a horizontal, longitudinally running flange 13 whose length is coextensive with the length of the pan. In practice, the pan runs some 15 inches, more or less, in length, and the flange serves for holding the pan stationary during the dough rolling and cutting steps and also expedites handling the pan during the subsequent baking steps, in manners best ascertainable from experienced usage.

Figure 5:
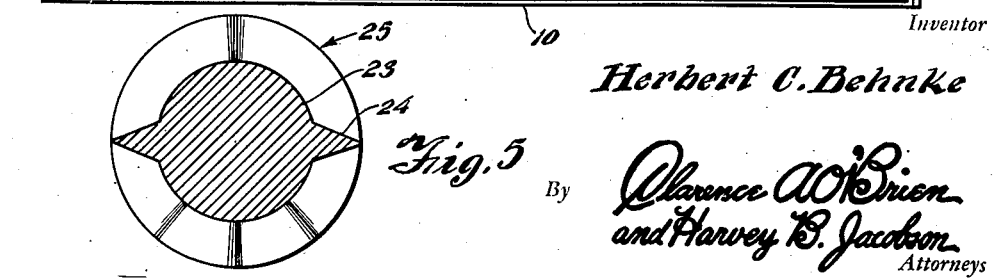
Figure 5 is an enlarged section on the line 5—5 of Figure 2, looking in the direction of the arrows.

The device or implement B comprises a frame structure with rollers mounted in the portions or sections of the frame structure. One section of the frame structure, which is U-shaped, is denoted by the numeral 14 and comprises a central bight portion 15 and lateral end portions 16. The end portions constitute arms to accommodate journal pins 17 fitting into sockets or bearings in the ends of the plain surfaced roller 18 to mount same for free idling between the arms 16. This constitutes a rotary rolling pin and the frame section constitutes a yoke carrying said pin. The remaining frame section is the same in construction and is differentiated by the numeral 19. It has its bight or connective portions 20 backed against the corresponding part 15 of the first-named frame and secured thereto. The arms 21 are provided with journal pins 22 to accommodate the rotary cookie dough cutter or roller. The roller proper is denoted by the numeral 23 and has its rolling and cutting surface provided with a plurality of ribs 24 of V-shaped cross-section, as shown in Figure 5. The ribs are in various arrangements on the surface to define a plurality of different and somewhat individual units, for example, 25 and 26 for striking out the dough in various patterns. I prefer, of course, that the patterns be of some fixed order. Hence, in Figure 7 I show what I mean by this. That is to say, here we see the cutting ribs so arranged on the surface of the roller as to define a plurality of designs of V-shaped form, of star formation, of diamond-shaped form, and so on and so forth. I have worked out the rib formations and patterns in such a way as to economize in aptly cutting the dough to get the most out of the amount which is placed in the tray preparatory to rolling and baking. The exact configuration of the designs is not too important, but I have found that the designs shown in Figure 7 lend themselves adaptable to achieving the principle of economy so needed in household cooking appliances of the types herein under consideration.

The tool or implement is to be used in the following manner. After placing lump of cookie or pastry dough in tray, the dough is rolled into a flat sheet of desired thickness until it fills all of the tray. The cutting roll is then rolled over the dough, thereby cutting the sheet into different shapes, with a minimum of waste, and ready to be placed into the oven for baking.

The advantages gained by using this tool over conventional methods are:

1. Roll and cutter are contained in one tool, replacing conventional rolling pin and individual cutters.
2. There is no waste between or at the sides of the shapes cut, only a small amount at the open ends of the tray.
3. The time required to make an equal number of cookies by the conventional method is approximately six times longer.
4. Six different shapes are obtained with the use of one tool only.

While experimenting with the illustrated model of the cookie maker, I found that after using the cutter the cut-outs are spread far enough apart so that it is possible to leave them on the tray and place the tray in the oven and bake.

By making the tray approximately 15 inches long, it is possible to use the tray as a baking plate, thus rendering unnecessary the work of transferring the cut-outs from the tray to a baking plate.

In practice, I have found it advisable to use a suitable hand-grip 27, preferably of the shape and proportions as shown in the drawing, and this is provided with a shank 28 (see Fig. 6) which is secured to the intermediate portion of the frame structure as a whole. This provides for desired balance and maneuverability of the tool or implement in relation to the tray or pan.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claim.

I claim:

A dough rolling and cutting implement of the class described comprising a pair of substantially V-shaped frame sections disposed in a plane with each other and having their bight portions secured rigidly together in back-to-back relationship, an upstanding hand-grip secured to said interconnected bight portions, and rollers rotatably mounted between the respective arm portions of said frame sections, said rollers being freely turnable, one roller having a smooth peripheral surface to serve as a dough flattening and rolling pin, the other roller having a plurality of cutting ribs arranged on its dough working surface in different shapes and relationships to provide designs and to cut out dough patterns of varying but predetermined configurations.

HERBERT C. BEHNKE.

REFERENCES CITED

The following references are of record in the file of this patent:

UNITED STATES PATENTS

| Number | Name | Date |
| --- | --- | --- |
| 126,833 | Rippon | May 14, 1872 |
| 132,736 | Pierce | Nov. 5, 1872 |
| 522,465 | Goodnough | July 3, 1894 |
| 825,849 | Lohmann | July 10, 1906 |
| 1,295,024 | Gosiewski | Feb. 18, 1919 |
| 1,396,684 | Hansen | Nov. 8, 1921 |
| 2,099,286 | Usbeck | Nov. 16, 1937 |

FOREIGN PATENTS

| Number | Country | Date |
| --- | --- | --- |
| 253,703 | Italy | July 2, 1927 |